US006206619B1

(12) United States Patent
Frisbie

(10) Patent No.: US 6,206,619 B1
(45) Date of Patent: Mar. 27, 2001

(54) NON-ADJUSTABLE SINGLE CYLINDRICAL LIP BORING TOOL

(76) Inventor: Barry Y. Frisbie, 2120 Arrowhead Ct., Elm Grove, WI (US) 53122

( * ) Notice: Subject to any disclaimer, the term of this patent is extended or adjusted under 35 U.S.C. 154(b) by 0 days.

(21) Appl. No.: 09/415,301

(22) Filed: Oct. 8, 1999

Related U.S. Application Data

(63) Continuation-in-part of application No. 09/126,295, filed on Jul. 30, 1998, now abandoned.

(51) Int. Cl.[7] ..................................................... B23B 51/02
(52) U.S. Cl. ........................... 408/144; 408/199; 408/227
(58) Field of Search ................................... 408/144, 211, 408/227, 199, 229, 230

(56) References Cited

U.S. PATENT DOCUMENTS

| 1,241,176 | | 9/1917 | Watts . | |
|---|---|---|---|---|
| 3,147,645 | * | 9/1964 | Cooper | 408/199 |
| 3,250,154 | * | 5/1966 | Breuning | 408/199 |
| 3,857,305 | | 12/1974 | Lichtman | 76/101 |
| 3,945,807 | * | 3/1976 | Fukutome | 408/230 |
| 4,080,093 | * | 3/1978 | Maier | 408/230 |
| 5,066,170 | | 11/1991 | Berryer | 407/54 |

* cited by examiner

Primary Examiner—Daniel W. Howell
(74) Attorney, Agent, or Firm—Donald J. Ersler

(57) ABSTRACT

A first embodiment of a non-adjustable single cylindrical lip boring tool includes a shank, a body, a straight side lip, and a front cutting edge. The shank is formed on an end opposite the body. The straight side cutting lip is formed on the body. The straight side lip has a radially convoluted relief which blends into the body. A second embodiment of a non-adjustable single cylindrical lip boring tool includes a shank, a body, a helical side lip, and a front cutting edge. The shank is formed on an end opposite the body. The helical side lip is formed around the body. The helical side lip has a radially convoluted relief which blends into the body. Both embodiments of the non-adjustable single cylindrical lip boring tool may be sharpened on a hand grinder.

10 Claims, 2 Drawing Sheets

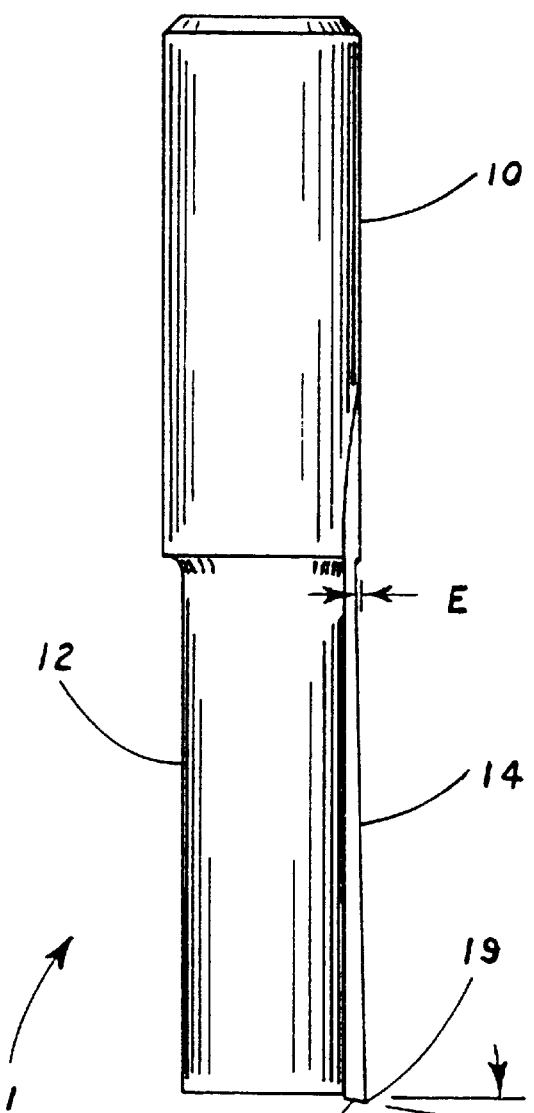
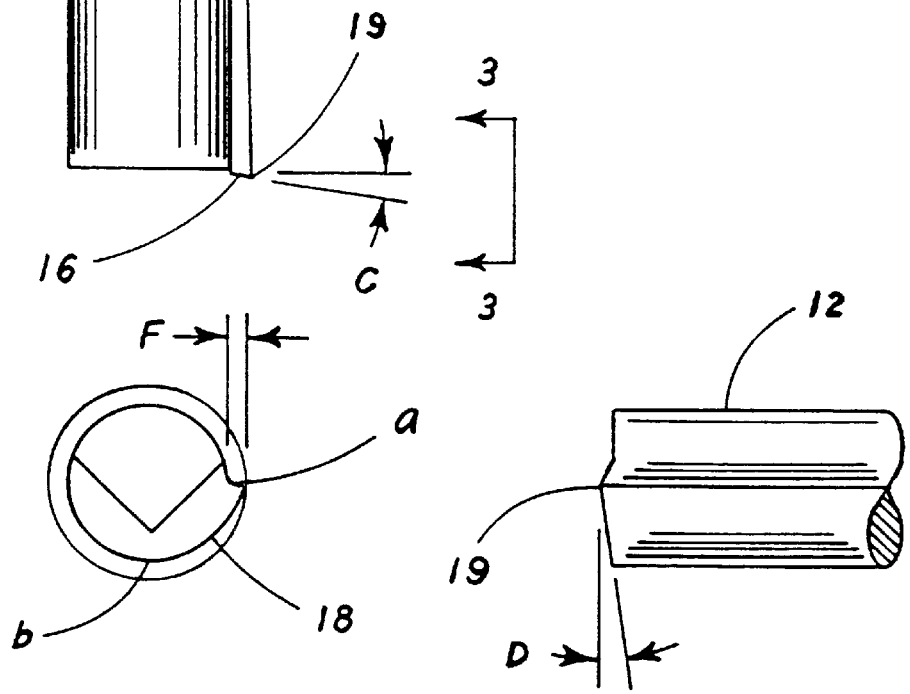
FIG. 1
FIG. 2
FIG. 3

NON-ADJUSTABLE SINGLE CYLINDRICAL LIP BORING TOOL

CROSS-REFERENCES TO RELATED APPLICATIONS

This is a continuation-in-part application Ser. No. 09/126,295 filed on Jul. 30, 1998.

BACKGROUND OF THE INVENTION

1. Field of the Invention

The present invention relates generally to cutting tools and more specifically to a non-adjustable single cylindrical lip boring tool which allows a machinist to greatly reduce the amount of time needed to create accurately located dowel pin holes in a piece part.

2. Discussion of the Prior Art

A problem frequently encountered with machine tools such as vertically spindled milling machines is maintaining locational accuracy of reamed dowel pin holes in a metal piece part. A dowel pin hole is commonly created by first drilling an undersized hole. The problem with the undersized hole is that drills tend to stray away or walk from the intended location, even when a center drill is employed. One way to solve the drill runout problem is to use a boring bar to straighten out the drill hole. The boring bar creates an opening which is a few thousands smaller than a reamer. The reamer is then used to remove the remaining few thousands of material. If the reamer were used without a boring bar, the reamer would follow the runout in the drilled hole and produce an inaccurately located dowel pin hole. Unfortunately, setting up the boring bar for creating the dowel pin hole is very time consuming. The drawback to using a boring bar is that the boring bar must be adjusted often as the bored hole is increased to the desired few thousands under reamer size.

Another solution to the problem of drill hole runout is to use an undersized end mill. The undersized end mill has the rigidity to prevent being pulled into a run out situation by a drill hole with runout. The drawback of the undersized end mill is two fold. First, end mills are not manufactured undersize. The supply for undersized end mills comes from worn end mills that have had their diameters resharpened. The other problem is that the end mill diameter may be inaccurately ground to a slightly negative taper along its axial length; this may cause one flute of the end mill to grab the side wall of the hole and lose hole locational accuracy.

Accordingly, there is a clearly felt need in the art for a non-adjustable single cylindrical lip boring tool which allows a user to consistently create an accurately located straight hole for final reaming of a dowel pin hole without time consuming boring bar set-up.

SUMMARY OF THE INVENTION

The primary objective of the present invention is to provide a non-adjustable single cylindrical lip boring tool which allows a user to consistently create an accurately located straight hole for final reaming of a dowel pin hole without time consuming boring bar set-up.

According to the present invention, a first embodiment of a non-adjustable single cylindrical lip boring tool includes a shank, a body, a straight side lip, and a front cutting edge. The shank is formed on an end opposite the body. The shank is a standard nominal sized diameter either English or Metric which is adapted for insertion into a chuck or spindle collet of a machine tool. The straight side lip is formed on the body. The straight side lip has a radially convoluted relief which blends into the body, and a slightly tapered axial relief that alleviates interference caused by deflectionary cutting forces. The front cutting edge has a back relief.

A second embodiment of a non-adjustable single cylindrical lip boring tool includes a shank, a body, a helical side lip, and a front cutting edge. The shank is formed on an end opposite the body. The shank is a standard nominal sized diameter which is adapted for insertion into a chuck or spindle collet of a machine tool. The helical side lip is formed around the body. The helical side lip has a radially convoluted relief which blends into the body and a slightly tapered axial relief that alleviates interference caused by deflectionary cutting forces. The front cutting edge has a back relief.

The non-adjustable single cylindrical lip boring tool is preferably manufactured for creating dowel pin holes in 1/16 inch diameter increments, or standard metric sizes. Both embodiments of the non-adjustable single cylindrical lip boring tool may be sharpened on a hand grinder. The single lip also means that the cutting tool has a single flute.

Accordingly, it is an object of the present invention to provide a non-adjustable single cylindrical lip boring tool which decreases the amount of time required to created an accurately located dowel pin hole.

It is a further object of the present invention to provide a non-adjustable single cylindrical lip boring tool which is easily sharpened.

Finally, it is another object of the present invention to provide a non-adjustable single cylindrical lip boring tool which does not require extensive machine tool set-up time.

These and additional objects, advantages, features and benefits of the present invention will become apparent from the following specification.

BRIEF DESCRIPTION OF THE DRAWINGS

FIG. 1 is a front view of a first embodiment of a nonadjustable single cylindrical lip boring tool in accordance with the present invention;

FIG. 2 is an end view of a non-adjustable single cylindrical lip boring tool in accordance with the present invention;

FIG. 3 is a side view of the front cutting edge of a first embodiment in accordance with the present invention;

DETAILED DESCRIPTION OF THE PREFERRED EMBODIMENTS

Figure 4:
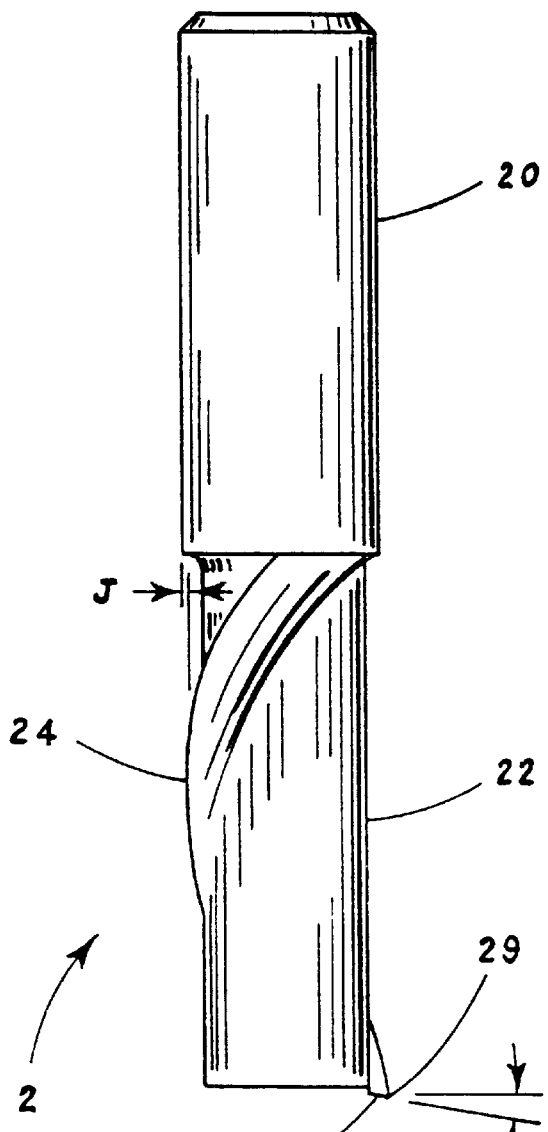
FIG. 4 is a front view of a second embodiment of a nonadjustable single cylindrical lip boring tool in accordance with the present invention.
Figure 5:
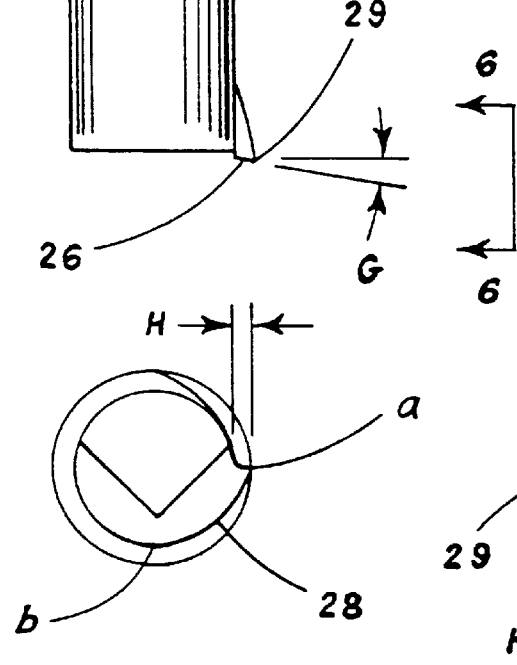
FIG. 5 is an end view of a non-adjustable single cylindrical lip boring tool in accordance with the present invention.
Figure 6:
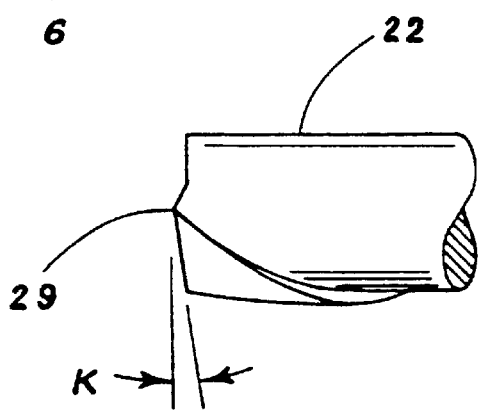
FIG. 6 is a side view of the front cutting edge of a second embodiment in accordance with the present invention.

With reference now to the drawings, and particularly to FIG. 1, there is shown a front view of a first embodiment of a nonadjustable single cylindrical lip boring tool 1. With reference to FIGS. 2 and 3, the non-adjustable single cylindrical boring tool 1 includes a shank 10, a body 12, a straight side lip 14, and a front cutting edge 16. The shank 10 is formed on an end opposite the body 12. The shank 10 is a standard nominal sized diameter which is adapted for insertion into a chuck or spindle collet of a machine tool. The shank 10 diameter is size dependent upon the dowel pin hole size. The straight side lip 14 is formed on the body 12. The straight side lip 14 preferably has a radially convoluted relief 18 which blends into the body 12. The hole created by the straight side lip 14 is less in diameter than the final hole diameter created after the reaming operation. The front cutting edge 16 has a front cutting edge angle C and a back relief angle D. The distance F describes the width of the front cutting edge 16.

The following dimensions are preferable and are given by way of example and not by way of limitation. These dimensions are proportionally the same for all sizes of non-adjustable single cylindrical lip boring tools 1 with the exception of the length of the shank 10. The shank 10 has a preferable length of 1½ inches. Preferably, the diameter of the shank 10 is ⅜ inch for dowel pins ⅜ inch and smaller. Preferably, the diameter of the shank 10 is the same size as dowel pins with a nominal diameter greater than ⅜ inch. Preferably, the straight side lip 14 has a length which is three times the nominal bore size of the dowel pin and its radially convoluted relief has a radius of curvature smaller at "b" than at "a." The curvature is the smallest or the least flat at "b" than at "a."

The straight side lip 14 also has a tapered axial relief as defined by dimension E which originates at cutting point 19 and terminates at the junction of the body 12 and shank 10. Dimension E is preferably 0.006 times the nominal bore size. Satisfactory performance has been found when the front cutting edge 16 has a rake angle of zero degrees, a front cutting angle C of 8 degrees, and a back relief D of 8 degrees. Preferably, the dimension F has a value of ⅛ times the nominal bore size.

A second embodiment of a non-adjustable single cylindrical lip boring tool 2 includes a shank 20, a body 22, a helical side lip 24, and a front cutting edge 26. The shank 20 is formed on an end opposite the body 22. The shank 20 is a standard nominal sized diameter which is adapted for insertion into a chuck or spindle collet of a machine tool. The helical side lip 24 preferably has a radially convoluted relief 28 and a tapered relief. The radially convoluted relief 28 blends into the body 22. The hole created by the helical side lip 24 is less in diameter than the final hole diameter created after the reaming operation. The front cutting edge 26 has a front cutting edge angle G and a back relief angle K. The distance H describes the width of the front cutting edge 26.

The following dimensions are preferable and are given by way of example and not by way of limitation. These dimensions are proportionally the same for all sizes of the non-adjustable single cylindrical lip boring tools 2 with the exception of the length of the shank 20. The shank 20 has a preferably length of 1½ inches. Preferably, the diameter of the shank 20 is ⅜ inch for dowel pins ⅜ inch and smaller. Preferably, the diameter of the shank 20 is the same size as dowel pins with a nominal diameter greater than ⅜ inch. Preferably, the helical side lip 24 has a length which is three times the nominal bore size of the dowel pin and its radially convoluted relief has a radius of curvature smaller at "b" than at "a." The curvature is the smallest or the least flat at "b" than at "a."

The tapered axial relief as defined by dimension J, originates at cutting point 29 and terminates at the junction of the body 22 and shank 20. Dimension J is preferably 0.006 times the nominal bore size. Satisfactory performance has been found when a front cutting angle G is 8 degrees, and a back relief K is 8 degrees. Preferably, the dimension H has a value of ⅛ times the nominal bore size.

Either embodiment is preferably fabricated from a single piece of hardened high speed steel, hardened cobalt steel, carbide, or material suitable for cutting steel or other metals. The cutting edges of either embodiment may be additionally hardened or coated with any suitable treatment such as titanium nitride deposition. It would also be possible to insert the straight side lip with a single non-adjustable piece of carbide which would diminish the necessity of using hardened tool steel or carbide throughout.

In operation, a dowel pin hole is created with either of the two embodiments of the non-adjustable single cylindrical lip boring tool by utilizing the following procedure. A hole is first drilled which is preferably 1/64 to 1/32 smaller than the desired reamer diameter. The range of 1/64 to 1/32 is dependent on the nominal size of the reamer. A center drill is not required for drilling the undersize hole. A non-adjustable single cylindrical lip boring tool with a cutting diameter that is only a few thousands undersize from the final desired nominal reamer size hole is used to enlarge the undersize hole. Lastly, a reamer is used to bring the hole to final size. The undersized drill, non-adjustable single cylindrical lip boring tool, and reamer are used in the same machine tool without having to unclamp the work piece.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A non-adjustable single cylindrical lip boring tool comprising:

a cylindrically shaped shank sized to be received by a machine tool's standard English or Metric nominally sized diameter spindle collet or chuck;

a body disposed at an end opposite said shank, said body having a front;

a straight side lip extending outward from said body, said straight side lip having an outermost radius from said shank center line which is slightly smaller than a radius of a hole that is formed by subsequent reaming operation, said straight side lip being disposed from said front of said tool to substantially said shank, said straight side lip having a tapered axial relief, said tapered axial relief extending from said front of said nonadjustable single cylindrical lip boring tool to substantially said shank, said straight side lip having a radially convoluted relief, said radially convoluted relief continuing around said nonadjustable single cylindrical lip boring tool to define a width of a front cutting edge, said radially convoluted relief having a radius of curvature which is greatest at said straight side lip and least at said body, said front cutting edge being formed on a top of said side lip, said front cutting edge having a front cutting angle and a back relief.

2. The non-adjustable single cylindrical lip boring tool of claim 1, wherein:

said non-adjustable single cylindrical lip boring tool being fabricated from hardened high speed steel.

3. The non-adjustable single cylindrical lip boring tool of claim 1, wherein:

said non-adjustable single cylindrical lip boring tool being fabricated from hardened cobalt steel.

4. The non-adjustable single cylindrical lip boring tool of claim 1, wherein:

said non-adjustable single cylindrical lip boring tool being fabricated from carbide.

5. The non-adjustable single cylindrical lip boring tool of claim 1, wherein:

said straight side lip being formed from a piece of carbide and inserted into said body.

6. A non-adjustable single cylindrical lip boring tool comprising:

a cylindrically shaped shank sized to be received by a machine tool's standard English or Metric nominally sized diameter spindle collet or chuck;

a body disposed at an end opposite said shank, said body having a front;

a helical side lip extending outward from said body, said helical side lip having an outermost radius from said shank center line which is slightly smaller than a radius of a hole that is subsequently reamed, said helical side lip being disposed from said front of said non-adjustable single cylindrical lip boring tool to substantially said shank, said helical side lip having a tapered axial relief, said tapered axial relief extending from said front of said non-adjustable single cylindrical lip boring tool to substantially said shank, said helical side lip having a radially convoluted relief, said radially convoluted relief continuing around said tool to define a width of a front cutting edge, said radially convoluted relief having a radius of curvature which is greatest at said helical side lip and least at said body, said front cutting edge being formed on a top of said side lip, said front cutting edge having a front cutting angle and a back relief.

7. The non-adjustable single cylindrical lip boring tool of claim 6, wherein:

said non-adjustable single cylindrical lip boring tool being fabricated from hardened high speed steel.

8. The non-adjustable single cylindrical lip boring tool of claim 6, wherein:

said non-adjustable single cylindrical lip boring tool being fabricated from hardened cobalt steel.

9. The non-adjustable single cylindrical lip boring tool of claim 6, wherein:

said non-adjustable single cylindrical lip boring tool being fabricated from carbide.

10. The non-adjustable single cylindrical lip boring tool of claim 6, wherein:

said helical side lip being formed from a piece of carbide and inserted into said body.

\* \* \* \* \*